(12) United States Patent
Wanta (10) Patent No.: US 12,429,875 B2
(45) Date of Patent: Sep. 30, 2025

(54) PROVIDING AUTONOMOUS MOWER CONTROL VIA GEOFENCING

(71) Applicant: Textron Innovations Inc., Providence, RI (US)

(72) Inventor: Brian David Wanta, North Augusta, SC (US)

(73) Assignee: Textron Innovations Inc., Providence, RI (US)

( * ) Notice: Subject to any disclaimer, the term of this patent is extended or adjusted under 35 U.S.C. 154(b) by 191 days.

(21) Appl. No.: 18/138,809

(22) Filed: Apr. 25, 2023

(65) Prior Publication Data

US 2024/0361765 A1    Oct. 31, 2024

(51) Int. Cl.
   G05D 1/00    (2024.01)
   A01D 34/00   (2006.01)

(52) U.S. Cl.
   CPC ......... G05D 1/0214 (2013.01); A01D 34/008 (2013.01); G05D 1/0088 (2013.01)

(58) Field of Classification Search
   None
   See application file for complete search history.

(56) References Cited

U.S. PATENT DOCUMENTS

| | | |
|---|---|---|
| 6,338,013 B1 | 1/2002 | Ruffner |
| 7,089,721 B2 * | 8/2006 | Turner .................. A01D 34/006 56/10.2 A |
| 7,429,843 B2 | 9/2008 | Jones et al. |
| 8,229,618 B2 | 7/2012 | Tolstedt et al. |
| 8,301,325 B2 | 10/2012 | Traster |
| 8,666,550 B2 | 3/2014 | Anderson et al. |
| 8,666,554 B2 | 3/2014 | Anderson |
| 8,706,297 B2 | 4/2014 | Letsky |
| 8,781,627 B2 | 7/2014 | Sandin et al. |
| 8,989,946 B2 | 3/2015 | Anderson |
| 9,420,741 B2 | 8/2016 | Balutis et al. |
| 9,510,505 B2 | 12/2016 | Halloran et al. |
| 9,554,508 B2 | 1/2017 | Balutis et al. |
| 9,826,678 B2 | 11/2017 | Balutis et al. |

(Continued)

FOREIGN PATENT DOCUMENTS

| | | |
|---|---|---|
| CA | 2364737 A1 | 5/2003 |
| CN | 108430210 A | 8/2018 |

(Continued)

OTHER PUBLICATIONS

PCT/US2024/020144 Notification of Transmittal of the International Search Report and the Written Opinion of the International Searching Authority, or the Declaration, dated Jun. 13, 2024; 9 pages.

*Primary Examiner* — Rachid Bendidi
*Assistant Examiner* — Nada Mahyoob Alqaderi
(74) *Attorney, Agent, or Firm* — BainwoodHuang (57) ABSTRACT

Techniques are directed to controlling a mower. Such techniques involve initiating an automated mowing task that directs the mower to operate in a geographic area defined by a virtual boundary. Such techniques further involve electronically detecting presence of a device within the geographic area defined by the virtual boundary. Such techniques further involve suspending the automated mowing task in response to detecting the presence of the device within the geographic area defined by the virtual boundary.

19 Claims, 5 Drawing Sheets

(56) References Cited

U.S. PATENT DOCUMENTS

| | | |
|---|---|---|
| 10,029,368 B2 | 7/2018 | Wolowelsky et al. |
| 10,034,421 B2 | 7/2018 | Doughty et al. |
| 10,067,232 B2 | 9/2018 | Halloran et al. |
| 10,091,930 B2 | 10/2018 | Balutis et al. |
| 10,222,773 B2 | 3/2019 | Funk et al. |
| 10,274,954 B2 | 4/2019 | Balutis et al. |
| 10,390,483 B2 | 8/2019 | Balutis et al. |
| 10,405,488 B2 | 9/2019 | Kamfors et al. |
| 10,485,164 B2 | 11/2019 | Letsky |
| 10,551,844 B2 | 2/2020 | Biber et al. |
| 10,561,063 B2 | 2/2020 | Hasegawa et al. |
| 10,705,533 B1 | 7/2020 | Bishel et al. |
| 10,785,907 B2 | 9/2020 | Doughty et al. |
| 10,831,212 B2 | 11/2020 | Coq et al. |
| 10,919,523 B2 | 2/2021 | Funk et al. |
| 11,103,995 B2 | 8/2021 | Shaw et al. |
| 11,172,607 B2 | 11/2021 | Hahn et al. |
| 11,197,414 B2 | 12/2021 | Zeiler et al. |
| 11,231,707 B2 | 1/2022 | Balutis et al. |
| 11,287,821 B2 | 3/2022 | Borinato |
| 11,297,764 B1 | 4/2022 | Milich |
| 11,334,082 B2 | 5/2022 | Frick et al. |
| 11,350,563 B2 | 6/2022 | Kraft |
| 11,358,274 B2 | 6/2022 | Yaozhang |
| 11,439,058 B2 | 9/2022 | Letsky |
| 11,449,061 B2 | 9/2022 | Afrouzi et al. |
| 11,483,967 B1 | 11/2022 | Grove et al. |
| 11,553,644 B2 | 1/2023 | Foster et al. |
| 11,561,275 B2 | 1/2023 | Ko et al. |
| 12,029,156 B1 * | 7/2024 | Simpson ............... A01D 34/008 |
| 2005/0034437 A1 | 2/2005 | Mcmurtry et al. |
| 2007/0233339 A1 | 10/2007 | Wehrlen et al. |
| 2009/0282642 A1 | 11/2009 | Batchelder et al. |
| 2013/0093627 A1 * | 4/2013 | Cosman ..................... G01S 5/01 |
| | | 342/451 |
| 2014/0176348 A1 * | 6/2014 | Acker, Jr. ................ G08G 1/04 |
| | | 340/932.2 |
| 2015/0128547 A1 | 5/2015 | Einecke et al. |
| 2015/0220086 A1 * | 8/2015 | Willgert ............... A01D 34/008 |
| | | 701/26 |
| 2017/0144654 A1 * | 5/2017 | Sham ..................... G08G 1/148 |
| 2019/0216014 A1 * | 7/2019 | Hahn ...................... A01D 34/54 |
| 2019/0339356 A1 * | 11/2019 | Schildknecht ........ G01S 7/4816 |
| 2020/0037499 A1 * | 2/2020 | Ko ......................... G05D 1/0088 |
| 2020/0170186 A1 | 6/2020 | Curtis |
| 2020/0173784 A1 * | 6/2020 | Chang ................... G05D 1/0221 |
| 2021/0046205 A1 | 2/2021 | Copeland, Jr. et al. |
| 2021/0064043 A1 | 3/2021 | Kulkarni et al. |
| 2021/0070356 A1 | 3/2021 | Lyzen et al. |
| 2021/0085143 A1 | 3/2021 | Takahashi et al. |
| 2021/0131805 A1 | 5/2021 | Biber |
| 2021/0176915 A1 | 6/2021 | Vines et al. |
| 2021/0235619 A1 | 8/2021 | Frick et al. |
| 2021/0365044 A1 * | 11/2021 | Xue ..................... G05D 1/0289 |
| 2021/0382490 A1 | 12/2021 | Wilson et al. |
| 2022/0007571 A1 | 1/2022 | Foster et al. |
| 2022/0061212 A1 | 3/2022 | Zeiler et al. |
| 2022/0066456 A1 | 3/2022 | Ebrahimi Afrouzi et al. |
| 2022/0129000 A1 | 4/2022 | Ingvalson et al. |
| 2022/0144305 A1 | 5/2022 | Ren et al. |
| 2022/0151144 A1 | 5/2022 | Ramsay et al. |
| 2022/0151450 A1 * | 5/2022 | Case ..................... B25J 13/003 |
| 2022/0167552 A1 | 6/2022 | Frick et al. |
| 2022/0174867 A1 | 6/2022 | Mccutcheon, IV et al. |
| 2022/0185317 A1 | 6/2022 | Kraft et al. |
| 2022/0197295 A1 | 6/2022 | Xu et al. |
| 2022/0240444 A1 * | 8/2022 | Wang ................... G05D 1/0259 |
| 2022/0253063 A1 | 8/2022 | Frick et al. |
| 2022/0408667 A1 | 12/2022 | Larsen |
| 2023/0020033 A1 | 1/2023 | Frick et al. |
| 2023/0069475 A1 | 3/2023 | Porter et al. |
| 2023/0141232 A1 * | 5/2023 | Zhou ................ G06Q 10/06314 |
| | | 701/23 |
| 2024/0061129 A1 * | 2/2024 | Boehm .................. G01S 19/42 |
| 2024/0315165 A1 * | 9/2024 | Simpson .............. G05D 1/0214 |

FOREIGN PATENT DOCUMENTS

| | | |
|---|---|---|
| CN | 112313591 A | 2/2021 |
| CN | 111771510 B | 12/2022 |
| DE | 102014212399 A1 | 12/2015 |
| EP | 2269433 A1 | 1/2011 |
| EP | 2959764 A1 | 12/2015 |
| EP | 2547193 B1 | 3/2017 |
| EP | 2013671 B1 | 4/2018 |
| JP | 2019201574 A | 11/2019 |
| KR | 20210008903 A | 1/2021 |
| WO | 2009106435 A1 | 9/2009 |
| WO | WO-2019030464 A1 * | 2/2019 |
| WO | 2019068175 A1 | 4/2019 |
| WO | 2019194628 A1 | 10/2019 |
| WO | 2021139413 A1 | 7/2021 |
| WO | 2022005840 A1 | 1/2022 |
| WO | 2022132281 A1 | 6/2022 |
| WO | 2022266411 A1 | 12/2022 |
| WO | 2023015411 A1 | 2/2023 |

\* cited by examiner

PROVIDING AUTONOMOUS MOWER CONTROL VIA GEOFENCING

BACKGROUND

A conventional unmanned self-propelled grass cutter includes a set of grass cutting blades or reels and a propulsion mechanism. During operation, the set of grass cutting blades or reels cuts grass while the propulsion mechanism propels the grass cutter over the ground.

Some conventional unmanned self-propelled grass cutters include object sensors to detect and steer around objects in their paths. Additionally, some conventional unmanned self-propelled grass cutters operate until they reach surrounding buried cables thus confining operation within restricted spaces.

SUMMARY

Unfortunately, there are deficiencies to the above-described conventional unmanned self-propelled grass cutters. For example, a conventional unmanned self-propelled grass cutter, which relies on an object sensor to avoid an object in its path, must get relatively close to the object before detecting and steering around that object. Such object detection is impractical or unsuitable for certain applications such as holes on a golf course in which the grass cutter may pose a nuisance on a hole even if the grass cutter is 100 yards (or more) away from golfers. Moreover, object sensors may require constant cleaning and may not work effectively under certain conditions (e.g., in rain or fog, in dimly lit spaces, etc.).

Additionally, a conventional unmanned self-propelled grass cutter, which has its operation confined by a buried cable, is similarly impractical or unsuitable for certain applications. Along these lines, a buried cable may confine the grass cutter to a restricted space but offers no ability to prevent the grass cutter from interfering with people in the vicinity such as golfer on a hole of a golf course. Moreover, buried cables require installation and maintenance, offers no flexibility, etc.

In contrast to the above-described conventional unmanned self-propelled grass cutters, improved techniques are directed to providing autonomous mower control via geofencing. Such techniques may involve initiating an automated mowing task in which a mower operates in a geofenced area (e.g., a geographic area defined by a virtual boundary) and suspending the mowing task when a specialized device is detected within the geofenced area (e.g., a golfer carrying the specialized device, a golf cart with the specialized device onboard, etc.). Such geofencing may utilize one or more wireless technologies such as the global positioning system (GPS) infrastructure, Bluetooth beaconing, other radio frequency (RF) mechanisms, combinations thereof, and so on. In some arrangements, suspending the mowing task may involve moving the mower out of a particular area (e.g., off a putting green, off of a fairway, etc.) to prevent the mower from interfering with various activity. In some arrangements, such techniques involve resuming the automated mowing task once the specialized device is no longer within the geofenced area. Accordingly, such techniques provide reliability, flexibility, and alleviate the need for object sensors and/or buried cables.

One embodiment is directed to a method of controlling a mower. The method includes initiating an automated mowing task that directs the mower to operate in a geographic area defined by a virtual boundary. The method further includes electronically detecting presence of a device within the geographic area defined by the virtual boundary. The method further includes suspending the automated mowing task in response to detecting the presence of the device within the geographic area defined by the virtual boundary.

Another embodiment is directed to electronic circuitry to control a mower. The electronic circuitry includes an interface and a controller coupled with the interface. The controller is constructed and arranged to perform a method of:

(A) initiating, through the interface, an automated mowing task that directs the mower to operate in a geographic area defined by a virtual boundary, (B) electronically, through the interface, detecting presence of a device within the geographic area defined by the virtual boundary, and (C) suspending, through the interface, the automated mowing task in response to detecting the presence of the device within the geographic area defined by the virtual boundary.

Yet another embodiment is directed to a computer program product having a non-transitory computer readable medium which stores a set of instructions to control a mower. The set of instructions, when carried out by computerized circuitry, causes the computerized circuitry to perform a method of:

(A) initiating an automated mowing task that directs the mower to operate in a geographic area defined by a virtual boundary;

(B) electronically detecting presence of a device within the geographic area defined by the virtual boundary; and (C) suspending the automated mowing task in response to detecting the presence of the device within the geographic area defined by the virtual boundary.

In some arrangements, suspending the automated mowing task includes, after the mower has begun mowing in the geographic area, driving the mower to a predefined location and parking the mower at the predefined location.

In some arrangements, a first designated parking location is a first distance from the device and a second designated parking location is a second distance from the device. Additionally, wherein driving the mower to the predefined location includes:

(i) selecting, as the predefined location, the second designated parking location over the first designated parking location based on the second distance being greater than the first distance, and (ii) moving the mower to the second designated parking location.

In some arrangements, the geographic area defined by the virtual boundary includes a hole on a golf course. The hole includes a green and fairway. Additionally, moving the mower to the second designated parking location includes moving the mower to a section of rough that is off of the green and the fairway.

In some arrangements, the method further includes, after the mower has been parked at the predefined location, resuming the automated mowing task that directs the mower to operate in the geographic area defined by the virtual boundary.

In some arrangements, the method further includes electronically detecting presence of the device within another geographic area that is outside the virtual boundary, the automated mowing task resuming in response to electronically detecting the presence of the device within the other geographic area.

In some arrangements, the method further includes electronically detecting that the device is no longer within the geographic area defined by the virtual boundary, the automated mowing task resuming in response to electronically detecting that the device is no longer within the geographic area defined by the virtual boundary.

In some arrangements, electronically detecting the presence of the device within the geographic area defined by the virtual boundary includes receiving a wireless signal indicating that the device has entered the geographic area.

In some arrangements, the device includes global positioning system (GPS) circuitry and a wireless transmitter, the wireless transmitter being constructed and arrange to include a current GPS location identified by the GPS circuitry in the wireless signal. Additionally, receiving the wireless signal includes extracting the current GPS location from the wireless signal and comparing the current GPS location to a set of predefined GPS locations to determine that the device has entered the geographic area.

In some arrangements, a Bluetooth apparatus is located in the geographic area to define at least part of the virtual boundary. Additionally, one of the device and the Bluetooth apparatus operates as a Bluetooth beacon, and the other of the device and the Bluetooth apparatus operates as a Bluetooth detector. Furthermore, receiving the wireless signal includes receiving an indication that the Bluetooth detector has detected the Bluetooth beacon.

In some arrangements, initiating the automated mowing task includes directing the mower to concurrently spin a set of mowing blades at a predefined height and drive in a predefined pattern in the geographic area to operate in at least a portion of the geographic area.

In some arrangements, the geographic area defined by the virtual boundary includes a hole on a golf course. Additionally, the method further includes:

(i) resuming the automated mowing task after the automated mowing task is suspended, and (ii) in response to completion of the automated mowing task, initiating another automated mowing task that directs the mower to operate in another geographic area defined by another virtual boundary that includes another hole on the golf course.

Other embodiments are directed to systems, vehicles/craft, apparatus, assemblies, and so on. Some embodiments are directed to various methods, componentry, platforms, and/or electronic environments/settings/infrastructures/etc. which are involved in providing autonomous mower control via geofencing.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique provides autonomous mower control via geofencing. Such a technique may involve initiating an automated mowing task in which a mower operates in a geofenced area (e.g., a geographic area defined by a virtual boundary) and suspending the mowing task when a specialized device is detected within the geofenced area (e.g., a golfer carrying the specialized device, a golf cart with the specialized device onboard or installed, etc.). Such geofencing may utilize one or more wireless technologies such as the global positioning system (GPS) infrastructure, Bluetooth beaconing, other radio frequency (RF) mechanisms, combinations thereof, and so on. Accordingly, such techniques provide reliability, flexibility, and alleviate the need for object sensors and/or buried cables.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
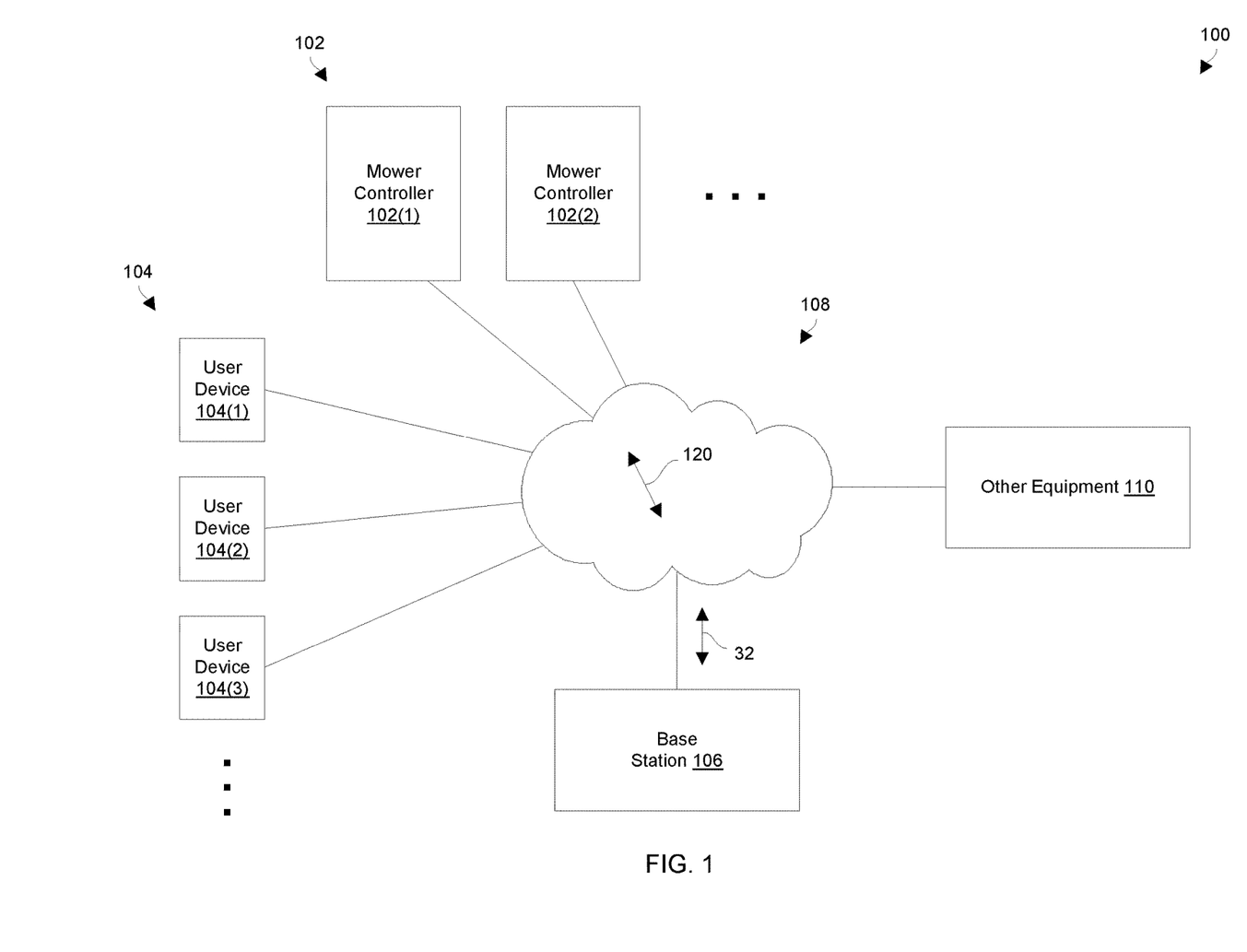
FIG. 1 is a block diagram of an example electronic system that provides autonomous mower control via geofencing in accordance with certain embodiments.

FIG. 1 is a block diagram of an example electronic system 100 that provides autonomous mower control via geofencing in accordance with certain embodiments. The system 100 includes mower controllers 102(1), 102(2), . . . (collectively, mower controllers 102), user devices 104(1), 104(2), 104(3), . . . (collectively, user devices 104), a base station 106, a communications medium 108, and perhaps other equipment 110.

In accordance with certain embodiments, the mower controllers 102 are constructed and arranged to install onto (or form part of) mowers, and then electronically control operation of the mowers based on wireless input from the base station 106. Examples of such control include beginning automated mowing tasks (e.g., to mow or otherwise operate in geographic areas defined by virtual boundaries), suspending automated mowing tasks (e.g., driving the mowers from current mowing locations to predefined locations, temporarily disabling the mowers, moving the mower to a different geographic area, etc.), and resuming automated mowing tasks (e.g., re-enabling the mowers, driving from predefined locations back to current mowing locations and continuing to mow the geographic areas, etc.). Other examples include sending data to the base station 106 (e.g., current locations, current speeds, current directions, current fuel status, operating conditions, detected events), receiving updated and/or further input from the base station 106 (e.g., automated commands, instructions manually provided by an operator, updated geofencing data/application/tools/etc.), performing other tasks, and so on.

To this end, the mower controllers 102 may include, among other things, specialized circuitry such as wireless transceivers for wireless communications, location circuitry (e.g., GPS circuitry, Bluetooth circuitry, other RF circuitry, combinations thereof, and the like), mower interfaces, and mower control circuitry. The wireless transceivers enable the mower controllers 102 to remotely communicate with the base station 106. The location circuitry enables the current locations of the mower controllers 102 to be determined. The mower interfaces enable the mower controllers 102 to connect with and operate various mower systems. The mower control circuitry enables the mower controllers 102 to execute particular mowing tasks (e.g., by controlling the mowers through the mower interfaces). The mower controllers 102 may include other componentry as well such as power supplies, local input and/or output controls, local communications ports, combinations thereof, and so on.

To impose control over the mowers, the mower controllers 102 may couple with and operate various subsystems of the mowers. Along these lines, the mower controllers 102 may couple with and operate the propulsion systems (e.g., to control speed, forward/reverse/neutral, idling, on/off, etc.), the steering systems (e.g., to control direction), sets of blades, reels, and/or other types of mowing assemblies (e.g., to control blade/reel height, blade/reel speed, etc.), and so on. To this end, the mower interfaces may include sets of electrical (or fiber optic) connectors/cables, sets of actuators/robotics, and so on.

In accordance with certain embodiments, the user devices 104 are constructed and arranged to accompany human users and communicate with the base station 106. Accordingly, the base station 106 is able to determine when the human users are within geofenced areas and then direct mowers (via the mower controllers 102) to operate in a manner that does not interfere with (e.g., avoids) the human users.

To this end, the user devices 104 may include specialized circuitry such as wireless transceivers for wireless communications, location circuitry (e.g., GPS circuitry, Bluetooth circuitry, other RF circuitry, combinations thereof, and the like), and perhaps other circuitry. The wireless transceivers enable the user devices 104 to communicate with the base station 106. The location circuitry enables the current locations of the user devices 104 to be determined. The user devices 104 may include other componentry as well such as power supplies, local input and/or output controls, local communications ports, combinations thereof, and so on.

The user devices 104 may take a variety of different form factors (e.g., pocket sized units, clip on or otherwise attachable units, apps running on mobile devices, black boxes, imbedded or integrated circuitry, etc.). Along these lines, in the context of golf course, the golfers on the course may carry the user devices 104 as they play golf on the golf course. Other golfers may place the user devices 104 in (or on) their pull carts. Yet other golfers may ride in drivable golf carts that have the user device 104 installed thereon.

In accordance with certain embodiments, the base station 106 is constructed and arranged to serve as an autonomous mower hub. Along these lines, the base station 106 is able to communicate with the mower controllers 102 and the user devices 104 to identify their various current locations, and then direct the mower controllers 102 to operate in a manner that does not interfere with human users in the vicinities of the user devices 104. For example, when a user device 104 enters a geofenced area that is currently being mowed by a mower which is controlled by a mower controller 102, the base station 106 may direct the mower controller 102 to suspend a mowing operation, move out the way, etc. When the user device 104 leaves the geofenced area (or virtual perimeter), the base station 106 may direct the mower controller 102 to resume the mowing operation.

The communications medium 108 is constructed and arranged to connect the various components of the electronic system 100 together to enable these components to exchange electronic signals 120 (e.g., see the double arrow 120). At least a portion of the communications medium 108 is illustrated as a cloud to indicate that the communications medium 108 is capable of having a variety of different topologies including backbone, hub-and-spoke, loop, irregular, combinations thereof, and so on. Along these lines, one or more portions of the communications medium 108 may be wireless and involve the use of wireless data communications devices. Additionally, one or more portions of the communications medium 108 may include copper-based data communications devices and cabling, fiber optic devices and cabling, combinations thereof, and the like. Furthermore, the communications medium 108 is capable of supporting LAN-based communications, SAN-based communications, cellular communications, WAN-based communications, distributed infrastructure communications, other topologies and/or wireless networking technologies, combinations thereof, etc.

The other equipment 110 represents other possible componentry of the electronic system 100 such as clients, servers, websites, and so on. For example, the user devices 104 may provide a variety of user services such as alerts/notification, email access, weather information, and so on. In the context of a golf course, the user devices 104 may enable golfers to contact a ranger if there is slow play ahead or an issue with the course, a club house to order food or make reservations, and so on. Further details will now be provided with reference to FIG. 2.

Figure 2:
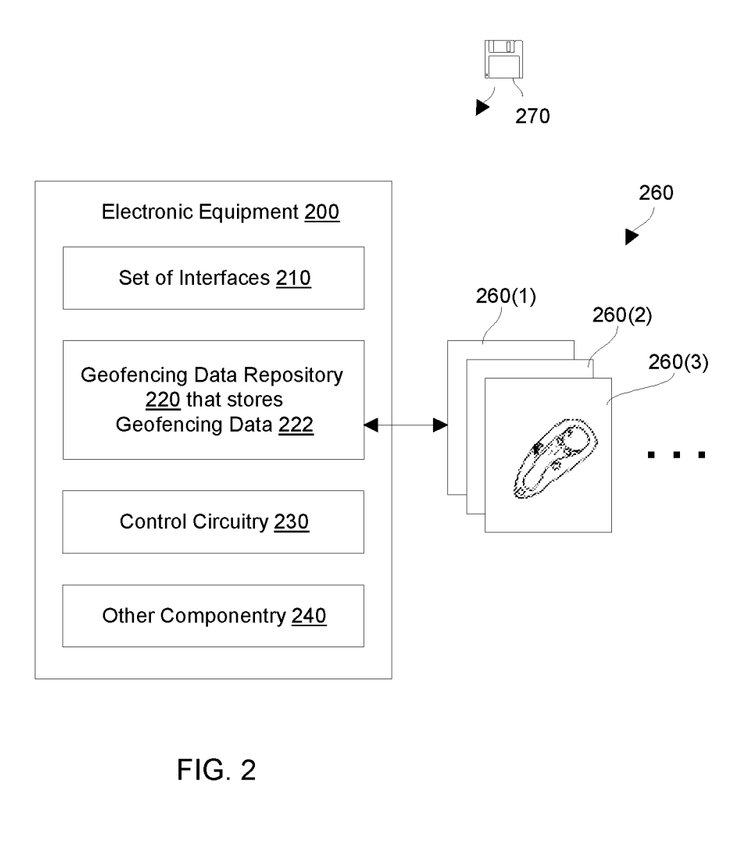
FIG. 2 is a block diagram of example electronic equipment that provides autonomous mower control via geofencing in accordance with certain embodiments.

FIG. 2 shows electronic equipment 200 that autonomously controls a mower in accordance with certain embodiments. The electronic equipment 200 includes a set of interfaces 210, a geofencing data repository 220 that stores geofencing data 222, control circuitry 230, and other componentry 240. It should be understood that the electronic equipment 200 may reside within the base station 106 (FIG. 1).

The set of interfaces 210 enables the electronic equipment 200 to communicate with other equipment. Along these lines, the set of interfaces 210 may include one or more network interfaces (e.g., a wireless transceiver, network card, etc.) to enable the electronic equipment 200 to communicate with other devices through the communications medium 108 (also see FIG. 1).

The geofencing data repository 220 stores geofencing data 222 for a set of geofenced areas 260(1), 260(2), 260(3), . . . (collectively, geofenced areas 260). Such a geofenced area 260 is a geographic area defined by a virtual boundary or perimeter.

For example, such a geofenced area 260 may be defined by a grid (or an array of cells/coordinates) of adjacent GPS locations. That is, the geofencing data 222 for the geofenced area 260 identifies GPS locations. Some GPS locations may be marked as belonging to the geofenced area 260, and other GPS locations may be marked as not belonging to the geofenced area 260. In this example, a user device 104 may report its current GPS location back to the base station 106.

Then, when a user device 104 moves into a GPS location that is marked as belonging to the geofenced area 260, the base station 106 considers the user device 104 as residing in (or having entered) the geofenced area 260. If the user device 104 moves into another GPS location that is marked as belonging to the geofenced area 260, the base station 106 considers the user device 104 as still residing in the geofenced area 260. However, when the user device 104 moves out of that GPS location and into a GPS location that marked as not belonging to the geofenced area 260, the base station 106 considers the user device 104 as no longer being in (or having exited) the geofenced area 260. This example provides certain advantages such as leveraging use of the publicly available GPS infrastructure (e.g., satellite signals), alleviating the need for specialized Bluetooth circuitry, etc.

As another example, such a geofenced area 260 may be defined by Bluetooth beaconing. That is, the geofencing data 222 for the geofenced area 260 identifies a set of Bluetooth beacons and/or a set of Bluetooth sensors. For example, in some Bluetooth beaconing arrangements, a set of the Bluetooth beacons are distributed around a geographic area and a user device 104 is a Bluetooth sensor. While the user device 104 detects at least one of the Bluetooth beacons, the user device 104 communicates such detection to the base station 106 which then considers the user device 104 as residing in (or having entered) the geofenced area 260. When the user device 104 no longer detects at least one of the Bluetooth beacons (e.g., for a predefined amount of time such as 30 seconds), the user device 104 communicates this situation to the base station 106 which then considers the user device 104 as no longer residing in (or as having exited) the geofenced area 260. This example provides certain advantages such as alleviating the need for specialized GPS circuitry.

As another example, in other Bluetooth beaconing arrangements, a set of the Bluetooth sensors is distributed around a geographic area 260 and a user device 104 operates as a Bluetooth beacon. While the set of Bluetooth sensors detects the user device 104 (i.e., the Bluetooth beacon), the set of Bluetooth sensors communicates such detection to the base station 106 which then considers the user device 104 as residing in (or having entered) the geofenced area 260. When the set of Bluetooth sensors no longer detects the user device 104 (e.g., for a predefined amount of time such as 30 seconds), the set of Bluetooth sensors communicates this situation to the base station 106 which then considers the user device 104 as no longer residing in (or as having exited) the geofenced area 260. Again, this example provides certain advantages such as alleviating the need for specialized GPS circuitry.

It should be understood that other geofencing technologies are suitable for use as well. For example, in some embodiments, geofenced areas may be associated with RF readers, and the user devices 104 include RFID card technology that can be brought close to the RF readers to inform the base station 106 that the user devices 104 are now entering geofenced areas 260. Other embodiment may involve combinations of geofencing technologies (e.g., GPS, Bluetooth beaconing, RF, etc.), and so on.

The control circuitry 230 of the electronic equipment 200 is constructed and arranged to perform one or more operations involved in controlling a mower in an automated manner. Such autonomous operation may include determining when a user device 104 has entered a geofenced area 260, initiating/suspending/resuming mower tasks, and/or the low level activities of operating the mower itself (e.g., mower direction, mower speed, blade/reel engagement/disengagement, blade/reel height, etc.).

It should be appreciated that the control circuitry 230 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 270 is capable of delivering all or portions of the specialized software to the electronic equipment 200. In particular, the computer program product 270 includes a non-transitory (or non-volatile) computer readable medium which stores a set of instructions that controls one or more operations of the electronic equipment 200. Examples of suitable computer readable storage media include tangible articles of manufacture and apparatus which store instructions in a non-volatile manner such as DVD, CD-ROM, flash memory, disk memory, tape memory, combinations thereof, and the like.

The other componentry 240 of the electronic equipment 200 refers to additional features/components that may belong to the electronic equipment 200. Along these lines, the electronic equipment 200 may have a set of user input/output (I/O) devices (e.g., a touchscreen, a keyboard, a mouse, a microphone, LEDs, a speaker, etc.), and so on.

As explained above, the electronic equipment 200 may reside within the base station 106. In accordance with some embodiments, the base station 106 operates as a autonomous mower hub to manage a fleet of mowers via the mower controllers 102 and monitor a fleet of user devices 104.

When the control circuitry 230 of the electronic equipment 200 determines that a user device 104 has entered a particular geofenced area 260, the control circuitry 230 determines whether there is a mower performing a mowing task in that particular geofenced area 260. If so, the control circuitry 230 directs the mower controller 102 that controls that mower to suspend the mowing task. Later, when the control circuitry 230 determines that the user device 104 has exited the particular geofenced area 260, the control circuitry 230 directs the mower controller 102 that directs that mower to resume the mowing task.

It should be appreciated that the base station 106 may provide this same mower control for multiple mowers simultaneously. For example, the base station 106 may coordinate operation of multiple mowers for a golf course at the same time. As another example, the base station 106 may concurrently operate fleets of mowers for multiple golf courses. Other mowing areas are suitable as well such as campuses for corporations, schools, government facilities, parks, sports complexes, residential areas/communities, fields and open spaces, combinations thereof, and so on.

When the electronic equipment 200 forms part of the base station 106, primary control is provided by the based station 106. Nevertheless, the mower controllers 102 may manage lower level mowing details (e.g., mower direction and speed within a geofenced area, blade/reel height, etc.) rather than the base station 106.

Furthermore, in other embodiments, at least some of the control is shifted to the mower controllers 102. Along these lines, one or more components (or component operations) of the electronic equipment 200 may reside within (or be performed by) the mower controllers 102 rather than the base station 106. For example, in some arrangements, the base station 106 performs the high level tasks such as communicating user device location details to the mower controllers 102, the mower controllers include the geofencing data repository 220 and control circuitry 230 for initiating, suspending, and resuming mowing tasks. Further details will now be provided with reference to FIGS. 3 and 4.

Figure 3:
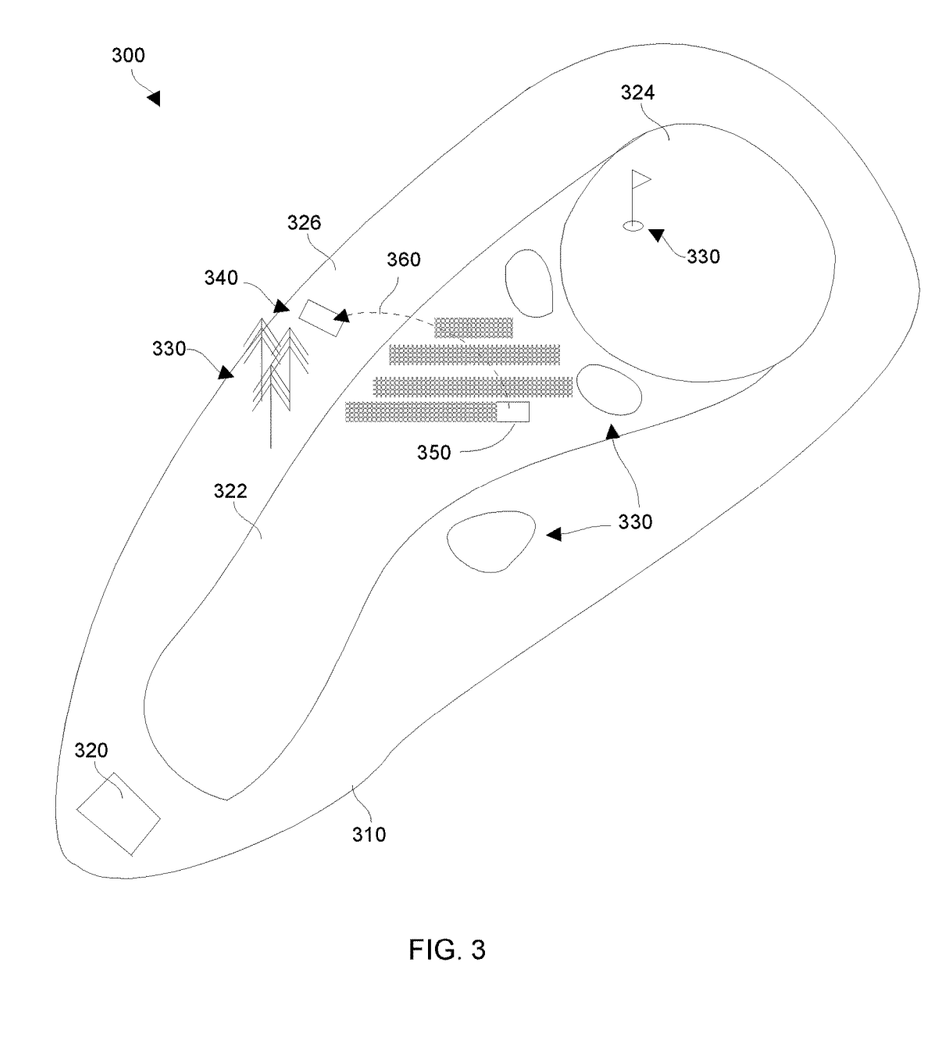
FIG. 3 is a block diagram of an example environment that utilizes the system of FIG. 1 in accordance with certain embodiments.
Figure 4:
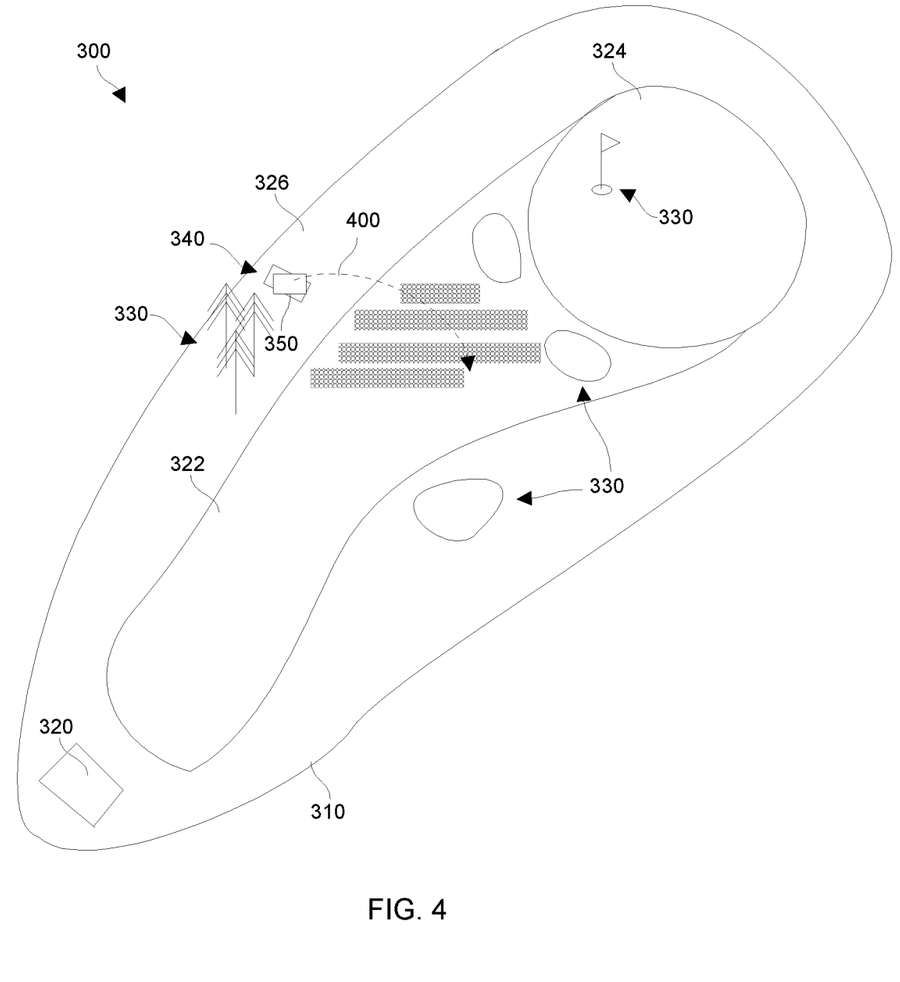
FIG. 4 is another block diagram of the example environment that utilizes the system of FIG. 1 in accordance with certain embodiments.

FIGS. 3 and 4 show an example environment 300 that utilizes the electronic equipment 200 (FIG. 2) for autonomous mower control via geofencing in accordance with certain embodiments. FIG. 3 shows the example environment 300 at a first time of operation. FIG. 4 shows the example environment 300 at a second time of operation.

By way of example only, the example environment 300 is a hole 310 on a golf course. Along these lines, the hole 310 includes various sections such as a tee box 320, a fairway 322, a green 324, and a rough 326. The hole 310 may include one or more other sections as well (e.g., ponds, marshes, rocky outcroppings, waste areas, etc.). Within the various sections, there may be various sub-regions and/or locations 330 such as a pin location, an apron around the green, sand traps, ponds, treed regions, steep inclines, cart paths, rocky areas, grounds under repair, mulch beds, sprinkler heads, yardage markers, and so on.

The geofencing data 222 within the geofencing repository 220 (FIG. 2) may define one or more geofenced areas 260 for the hole 310. For example, for determining whether there are any golfers on the hole 310, the geofencing data 222 may define a first geofenced area 260 that includes all of the various sections of the hole 310 (e.g., the tee box 320, the fairway 322, the green 324, and the rough 326). For one type of mower to mow (or cut) the fairway 322, the geofencing data 222 may define a second geofenced area 260 that includes just the fairway 322. For another type of mower to mow (or cut) the green 324, the geofencing data 222 may define a third geofenced area 260 that includes just the green 324, and so on.

It should be appreciated that, for autonomously mowing the fairway 322, the geofencing data 222 may be adjusted to avoid mowing certain sub-regions and marked locations 330 regions such as sand traps, grounds under repair, etc. Similarly, for autonomously mowing the green 324, the geofencing data 222 may be adjusted to avoid mowing the apron, and so on. Moreover, the geofencing data 222 may include particular mowing paths (or configurations) to handle various areas for aesthetics, difficult high/low spots, and so on.

When the electronic equipment 200 is ready to perform autonomous mower control via geofencing to mow the fairway 322, the electronic equipment 200 accesses the appropriate geofencing data 222. As just mentioned, the electronic equipment 200 may use a first geofenced area 260 to determine whether there are any golfers on the hole 310, and a second geofenced area 260 perhaps that overlaps the first geofenced area 260 for mowing a portion of the hole 310.

At this time, the electronic equipment 200 further identifies a predefined location 340 (i.e., a location that is out of the way and easily accessible to the mower). Accordingly, the mower may be directed to the predefined location 340 when a user device 104 enters the geofenced area 260.

The predefined location 340 is considered part of the geofencing data 222 and may be within the geofenced area 260 to be mowed. However, it should be appreciated that the predefined location 340 may be outside the geofenced area 260 to be mowed (e.g., at an "off to the side" or "out of the way" location in the rough 326). In some arrangements, corresponding predefined locations 340 are specified with the geofenced areas 260 and stored together within the geofencing data repository (e.g., as paired data).

To mow the fairway 322, the electronic equipment 200 initiates an automated mowing task that directs a mower 350 to begin a fairway 322 mowing task based on the appropriate geofencing data 222. In response, the mower 350 begins mowing within the fairway 322 (e.g., see the shaded rows within FIG. 3). Here, the mower 350 may mow in one or more paths or patterns (e.g., rows and columns, clockwise or counterclockwise around the perimeter, combinations thereof, etc.).

At some point, the electronic equipment 200 electronically detects presence of a user device 104 on the hole 310. The electronic equipment 200 considers that a user device 104 is on the hole 310 when operation of the user device 104 indicates that the user device 104 currently resides in a location of the geofenced area 260 for the hole 310. Along these lines, a golf car or a golfer carrying the user device 104 may have entered the geofenced area 260 that is used for determining whether there are any golfers on the hole 310. For example, one or more golfers may have just arrived at the tee box 320 or when one or more golfers drive on to the hole 310 to look for a golf ball that was hit from another hole 310.

In response to such presence detection, the electronic equipment 200 suspends the automated mowing task. Accordingly, the mower 350 avoids interfering with golf play on the hole 310.

In some embodiments, the electronic equipment 200 suspends the automated mowing task by driving the mower 350 from its current location (e.g., on the fairway 322) to the predefined location 340 as illustrated by the arrow 360 in FIG. 3. In some arrangements, the electronic equipment 200 turns the engine of the mower 350 off to prevent the mower 350 from being a distraction to golf play.

Once the electronic equipment 200 electronically determines that golf play has moved from the hole 310, the electronic equipment 200 resumes the automated mowing task. Such detection may involve determining that the user device 104 that had entered onto the hole 310 has now been detected at a next hole 310. Alternatively, such detection may involve determining that there are no user devices 104 currently on the hole and waiting a predefined amount of time (e.g., 30 seconds), etc.

Once golf play has moved from the hole 310, the electronic equipment 200 resumes the automated mowing task. For example, the electronic equipment 200 may turn the mower back on, may drive the mower 350 from the predefined location 340 back to the previous location on the fairway 322 as illustrated by the arrow 400 in FIG. 4, and then continue mowing the fairway 322.

It should be understood that such operation may continue until the mower 350 has completely mowed the fairway 322 of the hole 310. That is, if there is another user device 104 detected on the hole 310, the electronic equipment 200 temporarily suspends mowing until golf play has moved through the hole 310 (e.g., see FIGS. 3 and 4). Once the mower completes the mowing task, the mower controller 102 and the base station 106 may begin a new mowing task (e.g., proceed to another hole 310 on the golf course).

It should be understood that the above-described example is for a golf course by way of example only. Other mowing areas are suitable as well, e.g., around buildings, open acreages/farm areas, campuses, etc. Further details will now be provided with reference to FIG. 5.

Figure 5:
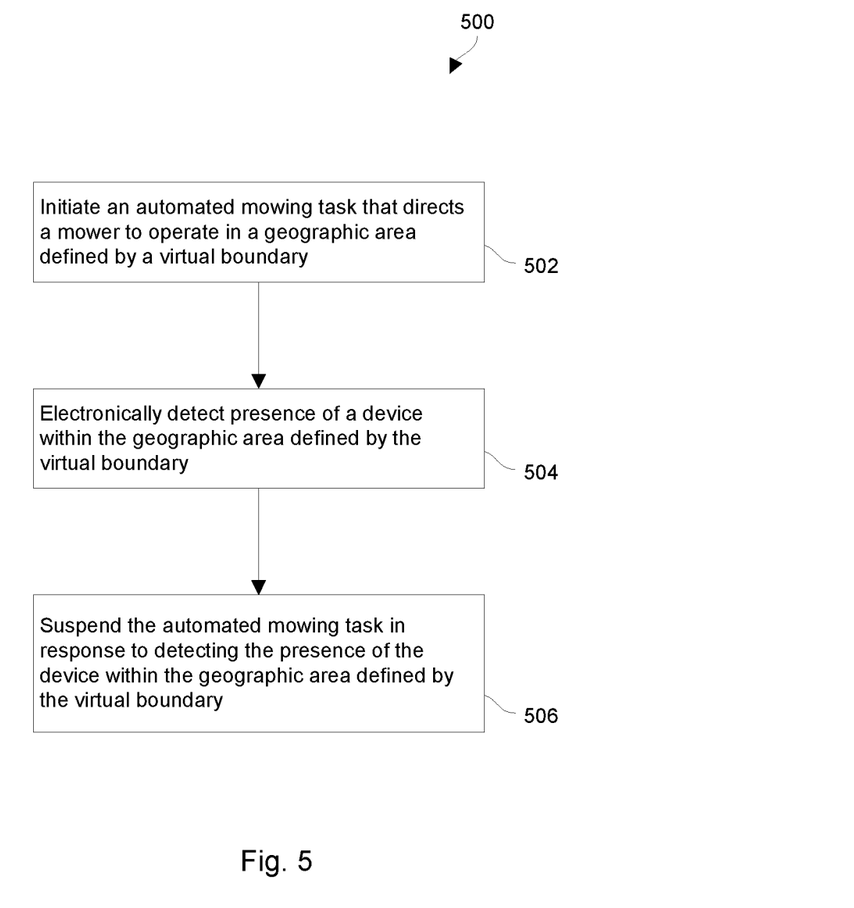
FIG. 5 is a flowchart of a procedure for providing autonomous mower control via geofencing in accordance with certain embodiments.

FIG. 5 is a flowchart of a procedure 500 for controlling a mower in accordance with certain embodiments. Such a procedure 500 may be performed by specialized circuitry (e.g., see the electronic equipment 200 in FIG. 2 which may represent a portion of a mower controller 102 and/or a portion of the base station 106, also see FIG. 1).

At 502, the specialized circuitry initiates an automated mowing task that directs the mower to mow (e.g., cut, trim, or otherwise treat a turf/lawn surface) in a geographic area defined by a virtual boundary (e.g., a geofenced area). Such initiation may involve sending a signal from a base station remotely to a mower directing the mower to start mowing.

At 504, the specialized circuitry electronically detects presence of a device within the geographic area defined by the virtual boundary. Such detection may involve comparing the current location (e.g., X, Y coordinates) of the device with a plurality of locations defining the geographic area.

At 506, the specialized circuitry suspends the automated mowing task in response to detecting the presence of the device within the geographic area defined by the virtual boundary. Such suspension may involve moving the mower to a predetermined location, turn off the mower, moving the mower to an unoccupied hole, etc.

Eventually, once the device is no longer within the geographic area defined by the virtual boundary, the specialized circuitry may resume the automated mowing task. In some arrangements, the specialized circuitry waits a predetermined amount of time to enable anyone in the vicinity to move further away from the geographic area and/or to prevent false determinations that the geographic area is unoccupied. In some arrangements in which the mower moved to operate in another geographic area, the specialized circuitry may wait until mowing of the other geographic area is complete before resuming the automated mowing task.

As described above, improved techniques are directed to providing autonomous mower control via geofencing. Such techniques may involve initiating an automated mowing task in which a mower 350 operates in a geofenced area 260 (e.g., a geographic area defined by a virtual boundary) and suspending the mowing task when a user device 104 is detected within the geofenced area 260 (e.g., a golfer carrying the specialized device, a golf cart with the specialized device onboard, etc.). Such geofencing may utilize one or more wireless technologies such as the global positioning system (GPS) infrastructure, Bluetooth beaconing, other radio frequency (RF) mechanisms, combinations thereof, and so on. In some arrangements, suspending the mowing task may involve moving the mower out of a particular area (e.g., off a putting green, off of a fairway, etc.) to prevent the mower from interfering with various activity. In some arrangements, such techniques involve resuming the automated mowing task once the user device 104 is no longer within the geofenced area 260. Accordingly, such techniques provide reliability, flexibility, and alleviate the need for object sensors and/or buried cables.

One should appreciate that the above-described techniques do not merely provide automated mower operation to replace a human. Rather, the disclosed techniques provide certain advantages and/or benefits. Along these lines, a human operating a mower may not be able to see (e.g., due to focus on mowing) or hear someone entering a geofenced area (e.g., due to mowing noise), but the techniques disclosed herein provide reliable detection thus improving safety. Additionally, a human operating a mower may not always know where to move the mower so that the mower is out of the way, but the techniques disclosed herein provide reliability, consistency, and so on. Also, autonomous mowing may be performed during the daytime without interfering with the normal course of play.

Furthermore, it should be understood that the automated mowing task may leverage certain automation technologies to control a mower. As a result, the operation of the mower may be primarily under computerized control (e.g., carried out by one or more machines/computers without the need of human participation and/or intervention).

Additionally, it should be understood that the mowers controlled by the mower controller 102 may be of various types, sizes, configurations, etc. Along these lines, some mowers may be scaled to move large swaths such as golf course fairways, while other mowers are specialized for close and careful grooming such as for golf greens. It should be appreciated that a variety of different surfaces are suitable including turf, lawns, other types of grassy and/or vegetative areas, and so on.

While various embodiments of the present disclosure have been particularly shown and described, it will be understood by those skilled in the art that various changes in form and details may be made therein without departing from the spirit and scope of the present disclosure as defined by the appended claims.

It should be understood that, from certain perspectives, autonomous mowers are a fairly new concept and have just begun making their way to golf course applications. Currently, an employee must be present as the mower operates to pause the autonomous mower and manually move the autonomous mowers out of the way of incoming golf. If a course does not have the personnel available to watch the mower, the mower will simply operate while golf is in the area and only avoid golfer/golf balls when the mower detects the golf play as a hazard which brings the mower dangerously close to pedestrians.

However, certain techniques are directed to autonomous mower control via fleet geofences. In some embodiments, autonomous mowers detect golf in proximity when a geofence is triggered.

Along these lines, with the advancement of technology in the automotive industry, companies are developing autonomous passenger vehicles. Autonomous mowers may soon make their way to golf courses and, with the introduction of operator-free units, comes extra risk when unsupervised around pedestrians. That is, an autonomous mower may not otherwise have the benefit of seeing incoming golfers and exiting the area to clear the path for play.

With the use of geofencing, certain techniques disclosed herein have the ability to detect when golfers enter the proximity of an autonomous mower and direct the mower to pause mowing and leave the current location to park in a designated area that does not interfere with golf. After golfers exit the geofence, the mower can travel back to its previous location and resume mowing.

In accordance with certain embodiments, wireless location tracking technology may be integrated into a fleet management program with autonomous mower applications. A user defines a certain area in which an autonomous mower operates by drawing a geofence around that area. When the mower is active, the geofence goes live and begins to look for any tracking devices to trigger the geofence. If a tracking device does trigger the geofence, an alert is sent to the autonomous mower hub to notify the mower to pause its current task and relocate to a parking spot designated by the golf course superintendent and his crew. Ideally, this parking spot would be located outside the bounds of the hole as to not interfere with golf play. After golf has passed and exited the geofence a second notification would be sent to the mower hub to notify the mower to resume its task and continue mowing where it left off.

Furthermore, nothing precludes the various improvements disclosed herein with other technologies such as object sensing/avoidance, cable sensing, and so on. Such modifications and enhancements are intended to belong to various embodiments of the disclosure.

What is claimed is:

1. A method of controlling a mower, the method comprising:
   initiating an automated mowing task that directs the mower to operate in a geographic area defined by a virtual boundary;
   electronically detecting presence of a device within the geographic area defined by the virtual boundary; and
   suspending the automated mowing task in response to detecting the presence of the device within the geographic area defined by the virtual boundary,
   wherein suspending the automated mowing task includes, while the mower is operating in the geographic area, directing the mower to a predefined location and parking the mower at the predefined location,
   wherein a first designated parking location is a first distance from the device and a second designated parking location is a second distance from the device, the second distance being greater than the first distance; and
   wherein driving the mower to the predefined location includes: (1) selecting, as the predefined location, the second designated parking location over the first designated parking location based on the second distance being greater than the first distance, and (2) moving the mower to the second designated parking location.

2. The method of claim 1, wherein the geographic area defined by the virtual boundary includes a hole on a golf course, the hole including a green and a fairway; and
   wherein directing the mower to the second designated parking location includes:
      directing the mower to a section of rough that is off of the green and the fairway.

3. The method of claim 1, further comprising:
   after the mower has been parked at the predefined location, resuming the automated mowing task that directs the mower to operate in the geographic area defined by the virtual boundary.

4. The method of claim 3, further comprising:
   electronically detecting presence of the device within a second geographic area that is outside the virtual boundary, the automated mowing task resuming in response to electronically detecting the presence of the device within the second geographic area.

5. The method of claim 3, further comprising:
   electronically detecting that the device is no longer within the geographic area defined by the virtual boundary, the automated mowing task resuming in response to electronically detecting that the device is no longer within the geographic area defined by the virtual boundary.

6. The method of claim 1, wherein electronically detecting the presence of the device within the geographic area defined by the virtual boundary includes:
   receiving a wireless signal indicating that the device has entered the geographic area.

7. The method of claim 6 wherein the device includes global positioning system (GPS) circuitry and a wireless transmitter, the wireless transmitter being constructed and arranged to include a current GPS location identified by the GPS circuitry in the wireless signal; and
   wherein receiving the wireless signal includes:
      extracting the current GPS location from the wireless signal and comparing the current GPS location to a set of predefined GPS locations to determine that the device has entered the geographic area.

8. The method of claim 6 wherein a Bluetooth apparatus is located in the geographic area to define at least part of the virtual boundary;
   wherein one of the device and the Bluetooth apparatus operates as a Bluetooth beacon, and the other of the device and the Bluetooth apparatus operates as a Bluetooth detector; and
   wherein receiving the wireless signal includes:
      receiving an indication that the Bluetooth detector has detected the Bluetooth beacon.

9. The method of claim 1, wherein initiating the automated mowing task includes:
   directing the mower to concurrently spin a set of mowing blades at a predefined height and drive in a predefined pattern in the geographic area to operate in at least a portion of the geographic area.

10. The method of claim 1, wherein the geographic area defined by the virtual boundary includes a hole on a golf course; and
    wherein the method further comprises:
       resuming the automated mowing task after the automated mowing task is suspended, and
       in response to completion of the automated mowing task, initiating another automated mowing task that directs the mower to operate in another geographic area defined by another virtual boundary that includes another hole on the golf course.

11. The method of claim 1, wherein (1) the geographic area defined by the virtual boundary is a first geographic area of a plurality of geographic areas defined by respective virtual boundaries described by geofencing data in a geofencing data repository, (2) the automated mowing task is a first automated mowing task for the first geographic area, and (3) the device is a first device of a plurality of devices capable of being present in any of the geographic areas;
    and further including, for one or more second geographic areas of the plurality of geographic areas and their respective virtual boundaries, repeating the initiating, detecting, and suspending operations for the respective second geographic area and one or more of the plurality of devices.

12. The method of claim 11, wherein the geographic areas are respective holes of a golf course, and the devices are carried by respective golfing individuals or groups moving among the holes of the golf course.

13. The method of claim 11, wherein electronically detecting the presence of the device within each of the geographic areas defined by the respective virtual boundaries includes receiving a wireless signal indicating that the device has entered the respective geographic area;
    and wherein the device includes global positioning system (GPS) circuitry and a wireless transmitter, the wireless transmitter being constructed and arrange arranged to include a current GPS location identified by the GPS circuitry in the wireless signal;
    and wherein receiving the wireless signal includes extracting the current GPS location from the wireless signal and comparing the current GPS location to a set of predefined GPS locations to determine that the device has entered the respective geographic area.

14. Electronic circuitry to control a mower, the electronic circuitry comprising:
    an interface;
    a controller coupled with the interface, the controller being constructed and arranged to perform a method of:

initiating, through the interface, an automated mowing task that directs the mower to operate in a geographic area defined by a virtual boundary, electronically, through the interface, detecting presence of a device within the geographic area defined by the virtual boundary, and suspending, through the interface, the automated mowing task in response to detecting the presence of the device within the geographic area defined by the virtual boundary, wherein suspending the automated mowing task includes, while the mower is operating in the geographic area, directing the mower to a predefined location and parking the mower at the predefined location, wherein a first designated parking location is a first distance from the device and a second designated parking location is a second distance from the device, the second distance being greater than the first distance; and wherein driving the mower to the predefined location includes: (1) selecting, as the predefined location, the second designated parking location over the first designated parking location based on the second distance being greater than the first distance, and (2) moving the mower to the second designated parking location.

15. Electronic circuitry of claim 14, wherein the method further includes:

after the mower has been parked at the predefined location, resuming the automated mowing task that directs the mower to operate in the geographic area defined by the virtual boundary.

16. Electronic circuitry of claim 14, wherein electronically detecting the presence of the device within the geographic area defined by the virtual boundary includes:

receiving a wireless signal indicating that the device has entered the geographic area.

17. Electronic circuitry of claim 14, wherein initiating the automated mowing task includes:

directing the mower to concurrently spin a set of mowing blades or reels at a predefined height and drive in a predefined pattern in the geographic area to operate in at least a portion of the geographic area.

18. Electronic circuitry of claim 14, wherein the geographic area defined by the virtual boundary includes a hole on a golf course; and wherein the method further includes:

resuming the automated mowing task after the automated mowing task is suspended, and in response to completion of the automated mowing task, initiating another automated mowing task that directs the mower to operate in another geographic area defined by another virtual boundary that includes another hole on the golf course.

19. A computer program product having a non-transitory computer readable medium which stores a set of instructions to control a mower; the set of instructions, when carried out by computerized circuitry, causing the computerized circuitry to perform a method of:

initiating an automated mowing task that directs the mower to operate in a geographic area defined by a virtual boundary;

electronically detecting presence of a device within the geographic area defined by the virtual boundary; and suspending the automated mowing task in response to detecting the presence of the device within the geographic area defined by the virtual boundary, wherein suspending the automated mowing task includes, while the mower is operating in the geographic area, directing the mower to a predefined location and parking the mower at the predefined location, wherein a first designated parking location is a first distance from the device and a second designated parking location is a second distance from the device, the second distance being greater than the first distance; and wherein driving the mower to the predefined location includes: (1) selecting, as the predefined location, the second designated parking location over the first designated parking location based on the second distance being greater than the first distance, and (2) moving the mower to the second designated parking location.

\* \* \* \* \*